US010850786B2

United States Patent
Maxwell et al.

(10) Patent No.: US 10,850,786 B2
(45) Date of Patent: Dec. 1, 2020

(54) TOY EXHAUST DEVICE FOR ATTACHMENT TO A REAR STAY OF THE FRAME OF A BICYCLE

(71) Applicants: Andrew James Maxwell, County Waterford (IE); Thomas Donald Maxwell, County Waterford (IE)

(72) Inventors: Andrew James Maxwell, County Waterford (IE); Thomas Donald Maxwell, County Waterford (IE)

(*) Notice: Subject to any disclaimer, the term of this patent is extended or adjusted under 35 U.S.C. 154(b) by 0 days.

(21) Appl. No.: 15/576,196

(22) PCT Filed: Apr. 29, 2016

(86) PCT No.: PCT/EP2016/059593
§ 371 (c)(1),
(2) Date: Nov. 21, 2017

(87) PCT Pub. No.: WO2016/184662
PCT Pub. Date: Nov. 24, 2016

(65) Prior Publication Data
US 2018/0201337 A1  Jul. 19, 2018

(30) Foreign Application Priority Data
May 21, 2015 (GB) .................................. 1508700.0

(51) Int. Cl.
*B62J 3/00* (2020.01)
*B62J 50/40* (2020.01)
(Continued)

(52) U.S. Cl.
CPC .................. *B62J 3/00* (2013.01); *A63H 5/00* (2013.01); *A63H 17/34* (2013.01); *A63H 33/30* (2013.01); *B62J 50/40* (2020.02)

(58) Field of Classification Search
CPC ... B62J 3/00; A63H 5/00; A63H 17/34; A63H 33/30
See application file for complete search history.

(56) References Cited

U.S. PATENT DOCUMENTS

| 513,168 A | 1/1894 | Isidor |
| 2,987,850 A * | 6/1961 | Bergland ................. A63H 5/00 446/404 |

(Continued)

FOREIGN PATENT DOCUMENTS

| EP | 0914852 A2 | 5/1999 |
| WO | 2004069637 A1 | 8/2004 |

OTHER PUBLICATIONS

ISR—WO 2016-184662.

*Primary Examiner* — Hau V Phan
(74) *Attorney, Agent, or Firm* — Fulwider Patton LLP

(57) ABSTRACT

A toy exhaust device (10) for attachment to a rear stay (11) of the frame of a bicycle, the device (10) comprises an elongate body unit (13) having formations (14, 15) thereon shaped so that the body unit (13) is locatable against the surface (16) of the rear stay 11, which surface (16) faces out from the frame, an exhaust pipe (17) extending from the body unit (13) to the rear of the frame and away therefrom, when the body unit (13) is attached thereto. The device (10) is symmetrically disposed about a plane of division (18) of the device (10), in which plane of division the longitudinal axis of the body unit (13) lies, and such that, in use, when an exhaust device (10) is attached to each side of the frame one device (10) will be a mirror image of the other device (10).

7 Claims, 9 Drawing Sheets

(51) Int. Cl.
*A63H 5/00* (2006.01)
*A63H 17/34* (2006.01)
*A63H 33/30* (2006.01)

(56) References Cited

U.S. PATENT DOCUMENTS

| | | | |
|---|---|---|---|
| 3,289,348 A | 12/1966 | Terry | |
| 3,754,350 A * | 8/1973 | Gorke | A63H 5/00 446/404 |
| 4,151,677 A * | 5/1979 | Tucker | A63H 5/00 116/56 |
| 4,735,592 A | 4/1988 | Griffin | |
| 6,039,338 A * | 3/2000 | Perea | B62J 3/00 280/288.4 |
| 6,394,875 B1 * | 5/2002 | Smith | A63H 5/00 280/288.4 |
| 7,344,429 B2 * | 3/2008 | Maxwell | B62J 3/00 280/288.4 |
| 8,388,011 B2 * | 3/2013 | Spencer | A63H 5/00 280/288.4 |
| 2011/0200202 A1 | 8/2011 | Flanigan | |

* cited by examiner

TOY EXHAUST DEVICE FOR ATTACHMENT TO A REAR STAY OF THE FRAME OF A BICYCLE

CROSS-REFERENCE TO RELATED APPLICATIONS

This application is based upon and claims the benefit of priority from the prior Patent Application No. PCT/EP2016/059593, filed on Apr. 29, 2016, which claims priority from U.K. 1508700.0 filed May 21, 2015, the entire contents of which are incorporated herein by reference.

BACKGROUND OF THE INVENTION

This invention relates to a toy exhaust device for attachment to a rear stay of the frame of a bicycle and, in particular, to a toy exhaust device which can be attached to either side of the frame. The invention also relates to a toy exhaust device, which includes a noise generating unit.

Toy exhaust devices are known, which are attached to the frame of a bicycle to give the impression that the bicycle is motorized.

Children using bicycles will often add simple devices for producing noise. The conventional noise generating mechanism for a bicycle involves inserting a card between the spokes of the bicycle wheel which produces a noise when struck by the spokes, in use.

A number of toy exhaust devices for attachment to a rear stay of the frame of a bicycle, and which include a noise generating mechanism, are known.

SUMMARY OF THE INVENTION

U.S. Pat. No. 7,344,429 B2 discloses a noise-producing device comprising a body having a clamp for mounting the body to a bicycle frame member, a card holder for securing a resiliently flexible card to the body, a resonant chamber in the body, and preferably, an exhaust pipe extending from the body. The device, disclosed by U.S. Pat. No. 7,344,429 B2 is marketed as the Turbospoke® Bicycle Exhaust System, by Tomax Ltd., Dublin, Ireland, which is currently available worldwide.

Patent Publication WO 03/035455 A1 discloses a sound-making device for attachment to bicycle wheels which includes a flared, horn-shaped tube, a flexible contact member for interaction with the bicycle spokes, and a universal mounting device for connecting the device to a bicycle.

However, the toy exhaust devices as hereinbefore described are designed to sit on a particular side of a bicycle. It has been found that such exhaust devices, when positioned on the other side of the bicycle, are asymmetric to the exhaust device as positioned on the intended side of the bicycle.

Furthermore, installation of the sound-making device of Patent Publication WO 03/035455 A1 involves the removal of the bicycle wheel, which requires adult supervision and may compromise the integrity of the bicycle.

It is an object of the present invention to overcome the disadvantages of the toy exhaust devices hereinbefore described.

Thus, the invention provides a toy exhaust device for attachment to a rear stay of the frame of a bicycle, the device comprising an elongate body unit having formations thereon shaped so that the body unit is locatable against the surface of the rear stay, which surface faces out from the frame, an exhaust pipe extending from the body unit to the rear of the frame and away therefrom, when the body unit is attached thereto, the device being symmetrically disposed about a plane of division thereof, in which plane of division the longitudinal axis of the body unit lies, and such that, in use, when an exhaust device is attached to each side of the frame one device will be a mirror image of the other.

The term "bicycle" as used herein is intended to encompass bicycles, tricycles, scooters and other vehicles with spoked wheels.

An advantage of the toy exhaust device according to the invention is that, in use, when the device is attached to each side of the bicycle frame, the devices will be symmetrically aligned, creating the effect of the bicycle having dual or twin exhaust pipes.

A further advantage of the toy exhaust device according to the invention is that, as it is locatable against the rear stay facing out from the frame, it will not interfere with the bicycle wheel.

In one embodiment of the toy exhaust device, the elongate body unit is generally A-shaped in cross section, with two side sections joined together to form a ridgeline on the outer surface of the body unit, which outer surface faces away from the frame, in use, and wherein the ridgeline lies in the plane of division.

An advantage of this aspect of the device is that, due to the shape of the body unit, it can be fitted to most shapes and sizes of bicycle frames, making the device suitable for attachment to most bicycles.

Preferably, the formations on the body unit are formed by the inner surfaces of the side sections and the angle therebetween, at the apex of the A-shape, is in the range of 85° to 95°.

An advantage of this aspect of the device is that, in use, the body unit is a close fit to the surface of the rear stay.

A further advantage of this aspect of the device is that it is slim in profile, and thus, in use, does not impede the normal function of most bicycles, when the device is attached to the chain stay on the side of the bicycle with the bicycle chain, for example.

Further, preferably, the formations on the body unit are formed by the inner surfaces of the side sections and the angle therebetween, at the apex of the A-shape, is 90°.

An advantage of this aspect of the device is that an angle of 90° has been found to provide the best fit for the device on a variety of bicycle shapes and sizes. The best fit is achieved due to the open and unconstrained form of the body unit.

In one embodiment of the toy exhaust device, a noise generating means is attachable to the body unit.

An advantage of this aspect of the device is that, in use, the exhaust device replicates the sound of a combustion engine.

Preferably, the noise generating means is an elongate, flexible card, one end of which is receivable in a card holder, which card holder is attachable to the body unit, such that, in use, when the device is attached to the frame, the other end of the elongate, flexible card is locatable between the spokes on the near side of the rear wheel of the bicycle.

An advantage of this aspect of the device is that, in use, the elongate, flexible card is held firmly in place.

Preferably, the elongate, flexible card is of a shape such that, in use, when struck by the spokes, it oscillates to create a resonant frequency, which frequency is determined by the physical parameters of the elongate, flexible card.

An advantage of this aspect of the device is that the elongate, flexible card can be of a plurality of shapes and sizes, which each create a corresponding and unique resonant frequency, in use.

In a further embodiment of the toy exhaust device, the body unit has a resonance chamber located therewithin, a first orifice located in the outer surface of the body unit and to one side of the ridgeline thereof, the orifice being in communication with the resonance chamber, and the elongate, flexible card being locatable over the first orifice.

An advantage of this aspect of the toy exhaust device is that the oscillation of the card against the orifice and into the resonance chamber, in use, amplifies the sound produced at the resonant frequency of the card.

Preferably, a second orifice is located in the outer surface of the body unit to the other side of the ridgeline thereof and symmetrically opposite the first orifice, such that, in use, the elongate, flexible card is locatable over the second orifice, when the device is attached to the other side of the bicycle frame.

An advantage of this aspect of the toy exhaust device is that, in use, the sound generated by the device will be amplified when the device is attached to either side of the bicycle frame. Thus, it is a simple matter to move the device from one side of the frame to the other, as the card holder can be located over the appropriate orifice.

Further, preferably, the card holder has formations thereon for holding the card over the first or second orifice, and a plug on the card holder, which plug blocks the orifice over which the card is not being held.

An advantage of this aspect of the toy exhaust device is that the device can be attached to either side of the bicycle frame with relative ease, and the generated sound will not be lost through the unused orifice.

In a further embodiment of the toy exhaust device, means for modulation of the oscillation of the elongate, flexible card is associated with the card holder.

An advantage of this aspect of the toy exhaust device is that, in use, the sound generated by the device can be altered if desired.

Preferably, the modulation means is an adjustable member which, in use, alters the shape of one end of the elongate, flexible card.

An advantage of this aspect of the toy exhaust device is that the modulation means can be engaged quickly and simply.

In a further embodiment of the toy exhaust device, the resonance chamber is in communication with the exhaust pipe, which is located at one end thereof.

An advantage of this aspect of the toy exhaust device is that as the sound exits the resonance chamber, it is further amplified in the exhaust pipe.

Further, preferably, the other end of the resonance chamber is closed by means of an attachable plug.

An advantage of this aspect of the toy exhaust device is that the sound generated within the resonance chamber must exit via the exhaust pipe, thus minimal sound is lost, in use.

In a further embodiment of the toy exhaust device, an adjustable knob is locatable on the body unit, on the opposite end thereof to the exhaust pipe, and a moveable cover is connected to the resonance chamber, which cover is moveable by means of the adjustable knob, within the resonance chamber, to a position beneath the first and second orifices.

An advantage of this aspect of the toy exhaust device is that the orifices can be partially or fully covered, in use, in order to adjust the volume of sound entering the resonance chamber.

In a further embodiment of the toy exhaust device the noise generating means is an electronic unit locatable within the body unit.

The electronic unit may be triggered by sensors which can be fitted to the spokes, causing the unit to produce an intermittent sound as each sensor passes the electronic unit, in use.

An advantage of this aspect of the toy exhaust device is that a broad range of sounds can be generated by electronic means.

A further advantage of this aspect of the toy exhaust device is that the noise is generated by non-mechanical means with no moving parts.

In a further embodiment of the toy exhaust device a piezoelectric sensor is located on the body unit, which piezoelectric sensor senses the oscillation of the card, and a sound unit located on the body unit, which sound unit is in communication with the piezoelectric sensor and converts the output therefrom into a variety of sounds.

An advantage of this aspect of the toy exhaust device is that the noise generated by the sound unit is directly proportional to the rate of oscillation of the card, in use.

In a further embodiment of the toy exhaust device, the body unit and exhaust pipe define a single unit.

An advantage of this aspect of the toy exhaust device is that the device can be manufactured easily and simply.

In a further embodiment of the toy exhaust device, the device is attachable to the frame by band means.

An advantage of this aspect of the toy exhaust device is that the device can be installed and removed quickly and simply from the bicycle.

A further advantage of this aspect of the toy exhaust device is that the band means only extends from the side of the stay towards the wheel, by the thickness of the band. Thus, the band will not interfere with the wheel and or chain of the bicycle.

In a further embodiment of the toy exhaust device, the band means is a pair of cable ties.

An advantage of this aspect of the toy exhaust device is that its components can be easily replaced.

DESCRIPTION OF SEVERAL VIEWS OF DRAWINGS

The invention will be further illustrated by the following description of embodiments thereof, given by way of example only with reference to the accompanying drawings in which.

DETAILED DESCRIPTION OF THE INVENTION

Figure 1:
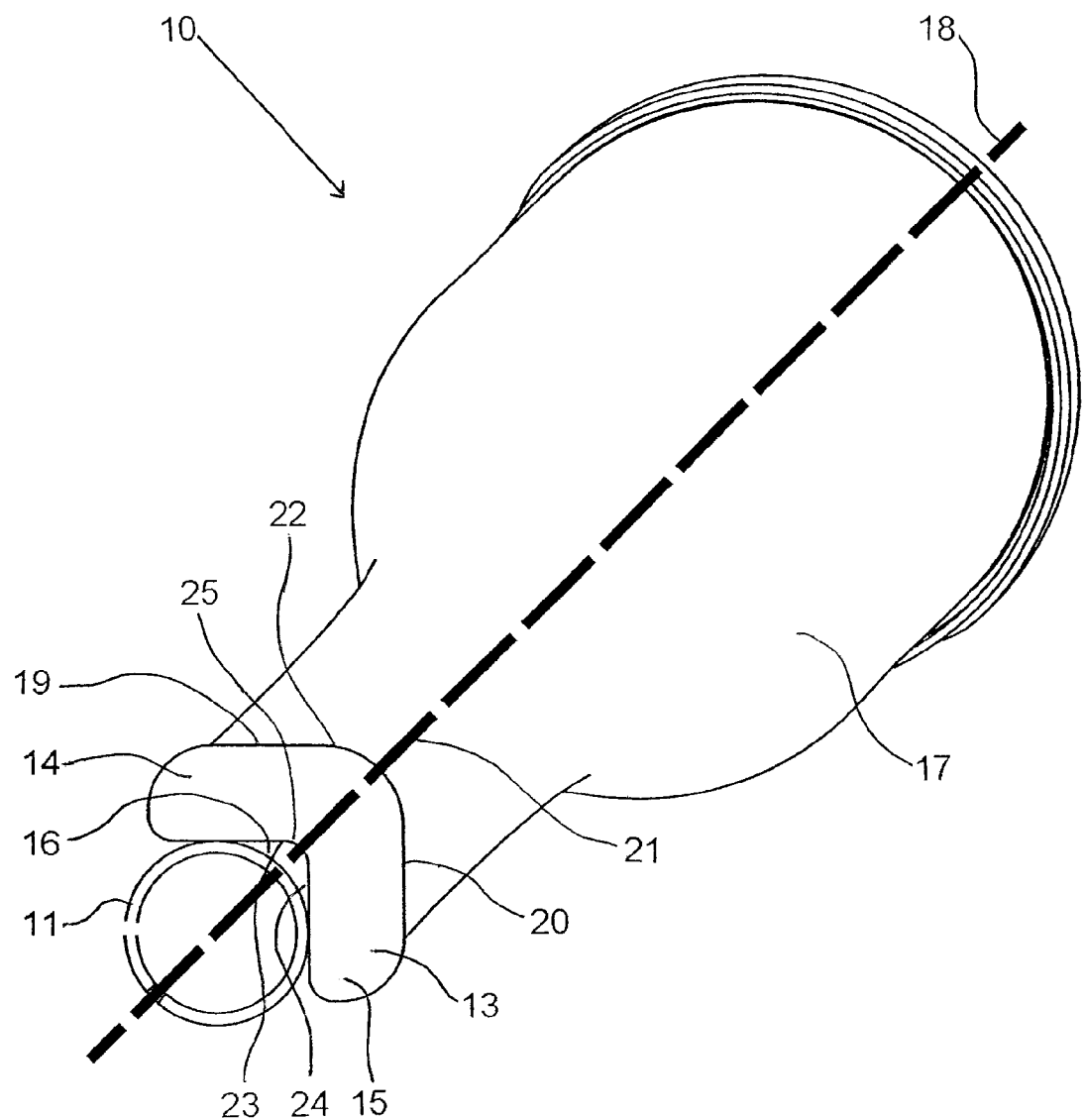
FIG. 1 is a schematic representation of a toy exhaust device in accordance with the invention, attached to one side of a bicycle frame.

Referring to FIG. 1, there is illustrated generally at 10, a toy exhaust device for attachment to a rear stay 11 of the frame of a bicycle (not shown). The device 10 comprises an elongate body unit 13 having formations 14, 15 thereon shaped so that the body unit 13 is locatable against surface 16 of the rear stay 11, which surface 16 faces out from the frame, in use. An exhaust pipe 17 extends from the body unit 13 to the rear of the frame and away therefrom, when the body unit 13 is attached thereto, with the device 10 being symmetrically disposed about a plane of division (indicated by broken line 18) thereof.

The body unit 13 is generally A-shaped in cross section, with two side sections 19, 20 joined together to form a ridgeline 21 on outer surface 22 of the elongate body unit 13, which outer surface 22 faces away from the frame, in use, and wherein the ridgeline 21 of the body unit 13 lies in the plane of division 18.

The formations 14, 15 on the elongate body unit 13 are formed by inner surfaces 23, 24 of the side sections 19, 20, respectively and the angle therebetween, at apex 25 of the A-shape, is 90°.

Figure 2:
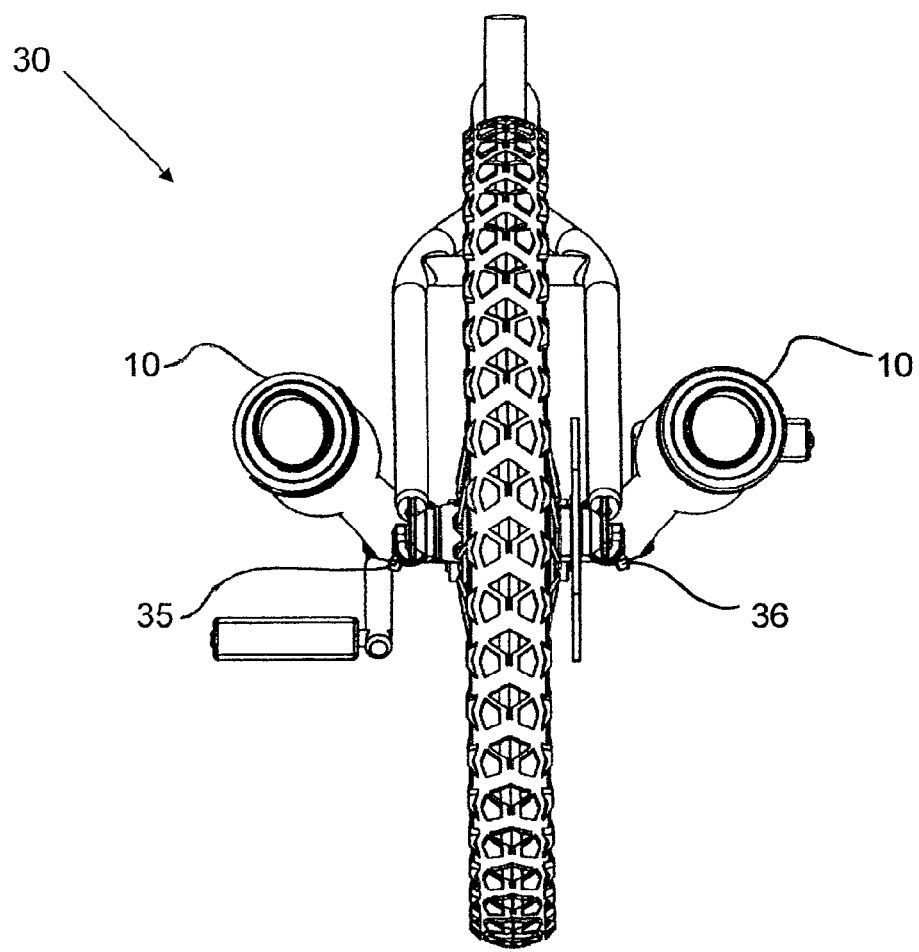
FIG. 2 is a rear view of the toy exhaust device of FIG. 1 attached to either side of the bicycle frame.

Referring to FIG. 2, there is illustrated generally at 30, a bicycle frame, on each side of which a toy exhaust device 10, in accordance with the invention, is attached.

Each device 10 is attached to the frame 30 by band means in the form of cable ties 35, 36.

Figure 3:
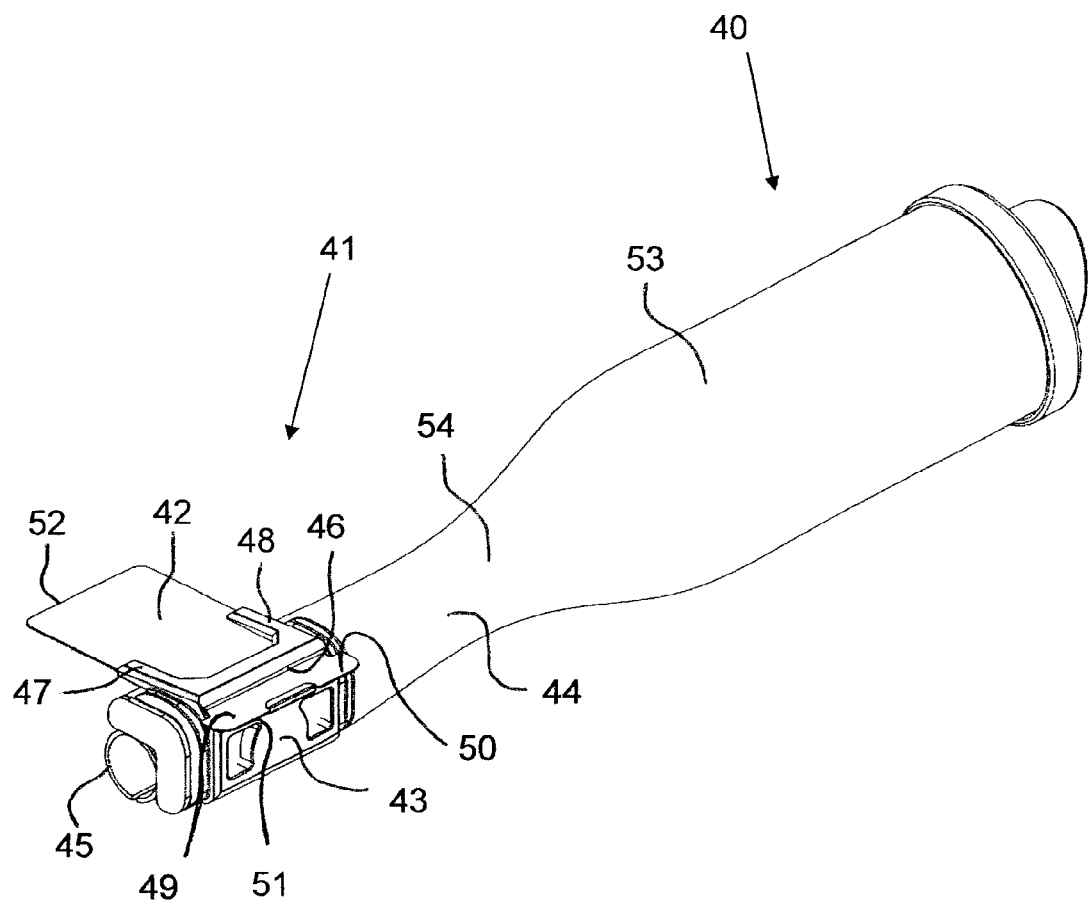
FIG. 3 is a schematic representation of a further embodiment of a toy exhaust device in accordance with the invention, wherein a noise generating means is attached thereto.

Referring to FIG. 3, a further embodiment of a toy exhaust device in accordance with the invention is illustrated generally at 40, to which a noise generating means, shown generally at 41, is attached.

The noise generating means 41 is an elongate, flexible card 42, located within a card holder 43, which card holder 43 is attachable to body unit 44, in use, when the device 40 is attached to a stay 45 of a bicycle frame (not shown).

The elongate, flexible card 42 is inserted into a slot 46 in the card holder 43 and is held between two tracks 47, 48 on the card holder 43. Shoulders 49, 50 on one end 51 of the elongate, flexible card 42 prevent the card 42 from passing completely through the slot 46, in use. Other end 52 of the elongate, flexible card 42 is locatable between the spokes (not shown) on the near side of the rear wheel of the bicycle (both not shown).

The body unit 44 and exhaust pipe 53 are formed as a single unit 54.

Figure 4:
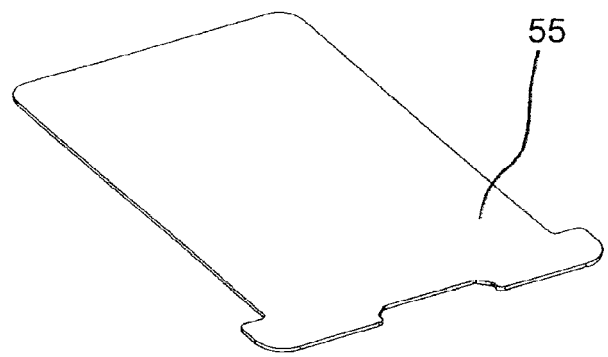
FIG. 4 is a representation of a card for use in the device of FIG. 3.
Figure 5:
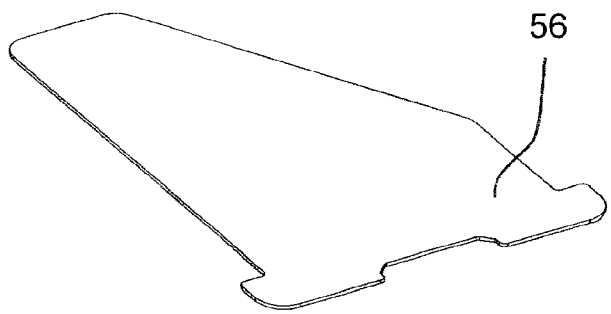
FIG. 5 is a representation of an alternative card for use in the device of FIG. 3.
Figure 6:
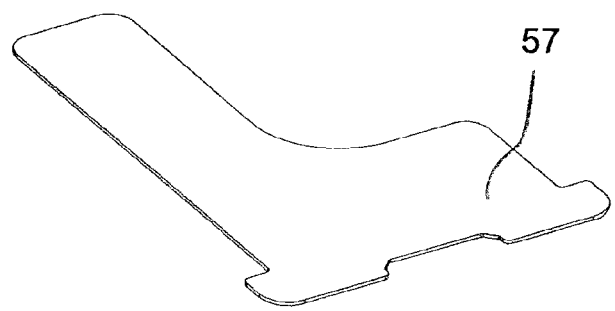
FIG. 6 is a representation of a further alternative card for use in the device of FIG. 3.

Referring to FIG. 4, FIG. 5 and FIG. 6, differently shaped elongate, flexible cards 55, 56, 57 are illustrated. The cards 55, 56, 57 are receivable in the cardholder 43 of FIG. 3. The shapes of the cards 55, 56, 57 are such that, in use, when struck by the spokes (not shown), they oscillate to create a sound having a particular resonant frequency, which frequency is determined by the physical parameters of the particular elongate, flexible card 55, 56, 57.

Figure 7:
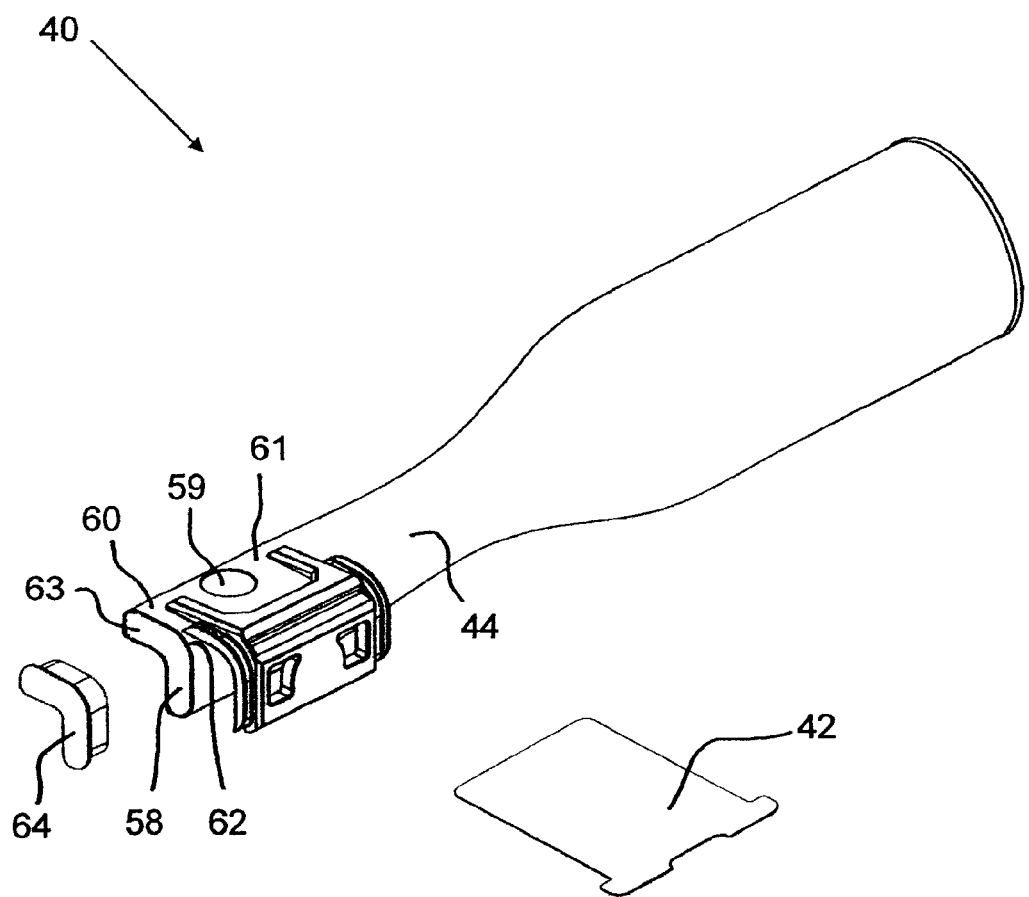
FIG. 7 is an exploded view of the toy exhaust device of FIG. 3.

Referring to FIG. 7, an exploded view of the toy exhaust device 40 of FIG. 3 is shown.

The body unit 44 has a resonance chamber 58 located therewithin, a first orifice 59 located in outer surface 60 of the body unit 44 and to one side 61 of the ridgeline 62 thereof. The first orifice 59 is in communication with the resonance chamber 58, and the elongate, flexible card 42 is locatable over the first orifice 59.

End 63 of the resonance chamber 58 is closed, in use, by means of an attachable plug 64.

Figure 8:
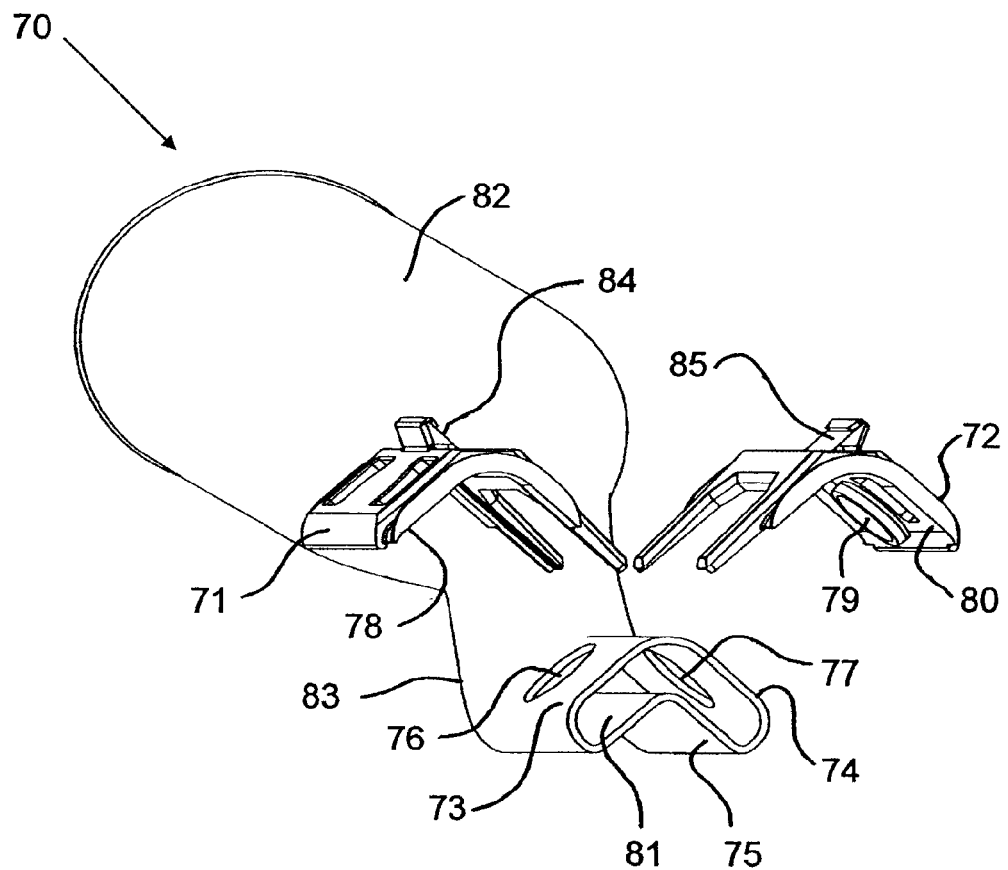
FIG. 8 is a schematic representation of the toy exhaust device of FIG. 3, wherein the card holder is shown to be locatable on either side of the body unit.

Referring to FIG. 8, there is illustrated generally at 70, a toy exhaust device in accordance with the invention, wherein two card holders 71, 72 are shown to illustrate the alternative positions of a card holder on either side 73, 74 of body unit 75. In practice, only one of the card holders 71, 72 is attached to the toy exhaust device 70, depending on which side of a bicycle the toy exhaust device 70 is to be attached.

The body unit 75 has a first orifice 76 on side 73 thereof and a second orifice 77 on the other side 74 of the body unit 75. In use, the card holder 71 is attached to the body unit 75, such that an elongate, flexible card (not shown) located therein will overlie the second orifice 77. At the same time a plug (not shown) on inner surface 78 of the card holder 71 will block the first orifice 76.

In similar fashion, if the card holder 72 is attached to the body unit 75, in place of the card holder 71, an elongate, flexible card (not shown) located therein will overlie the first orifice 76. At the same time a plug 79 on inner surface 80 of the card holder 72 will block the second orifice 77.

A resonance chamber 81 is in communication with an exhaust pipe 82, which is located at one end 83 thereof.

The card holders 71, 72 have resilient clips 84, 85, respectively, mounted thereon for keeping the elongate, flexible card in place, in use.

Figure 9:
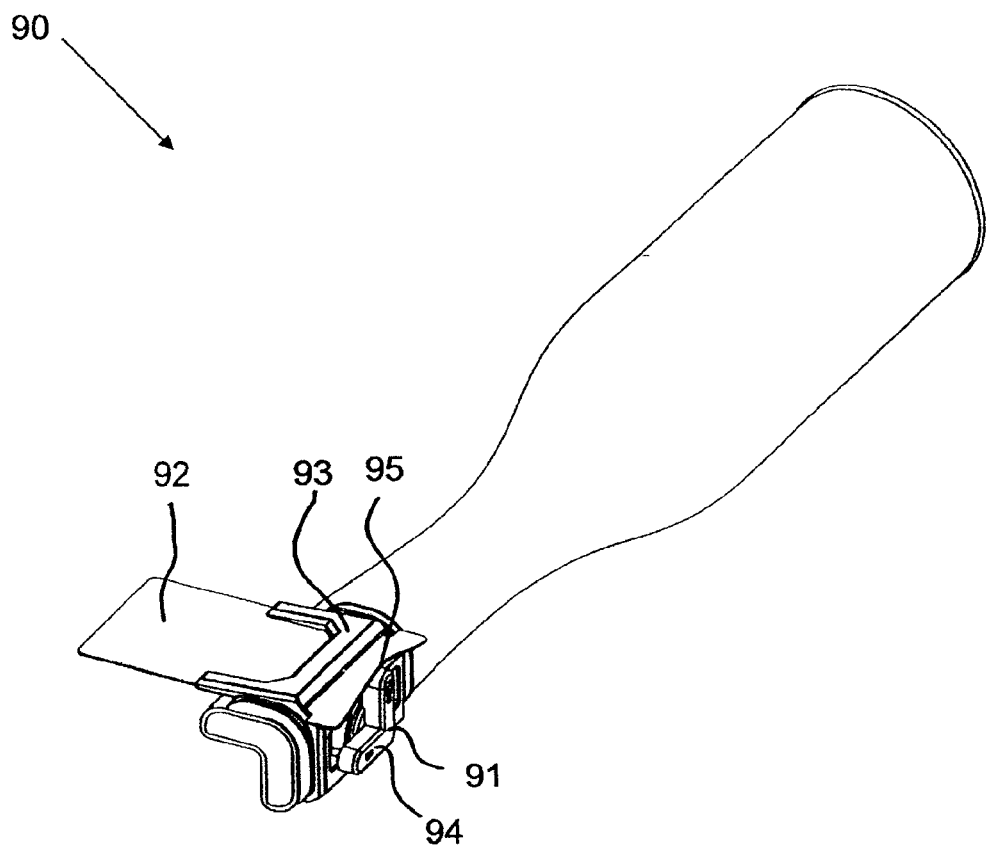
FIG. 9 is a schematic representation of a further embodiment of a toy exhaust device in accordance with the invention, wherein means for modulation of the oscillation of the card is attached thereto.

Referring to FIG. 9, a schematic representation of a further embodiment of a toy exhaust device, in accordance with the invention, is illustrated generally at 90.

Means 91 for modulation of the oscillation of an elongate, flexible card 92 is attached to a card holder 93.

The modulation means 91 is in the form of an adjustable rod 94 which, in use, presses against one end 95 of the elongate, flexible card 92 so as to alter the shape thereof, resulting in the modulation of the oscillation of the elongate, flexible card 92.

Figure 10:
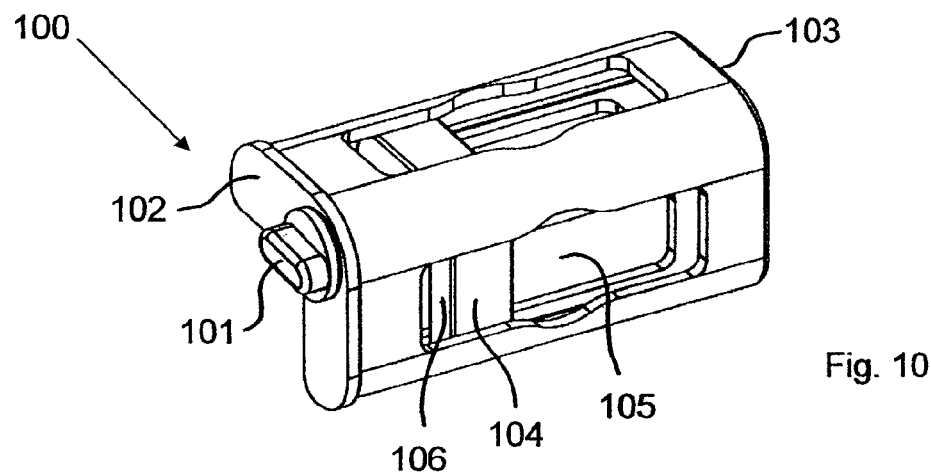
FIG. 10 is a schematic representation of a further embodiment of a toy exhaust device according to the invention, wherein an adjustable knob is shown with the moveable cover in an open position.

Referring to FIG. 10, a schematic representation of a further embodiment of a body unit for a toy exhaust device according to the invention, is illustrated generally at 100.

An adjustable knob 101 is located on end 102 of the body unit 100, which end 102 is opposite to end 103 to which an exhaust pipe (not shown) is attachable.

A moveable cover 104, located within a resonance chamber 105, is connected to the adjustable knob 101.

Figure 11:
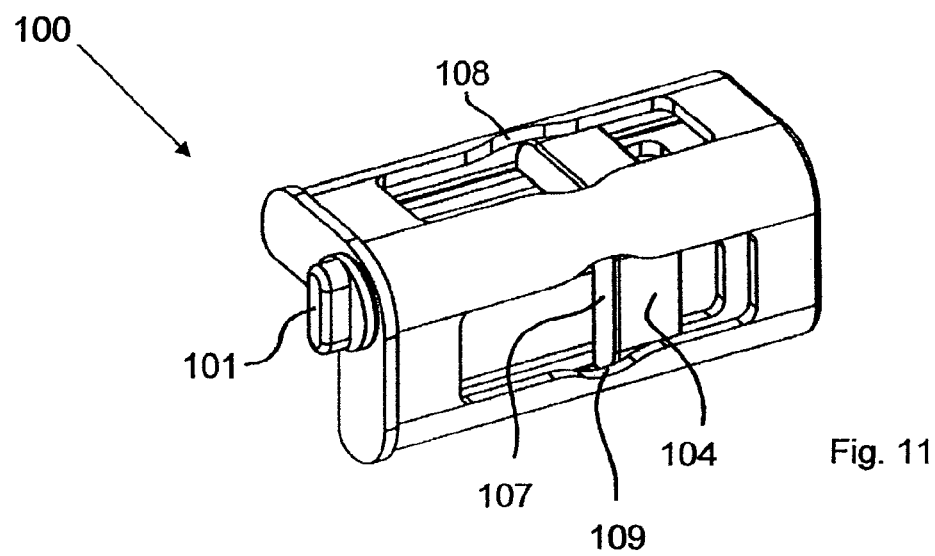
FIG. 11 is a schematic representation of the toy device of FIG. 10, wherein the adjustable knob is shown with the moveable cover in a closed position.

Referring to FIGS. 10 and 11, the moveable cover 104 is moveable between an open position 106, within the resonance chamber 105 (see FIG. 10), where the sound reaching the resonance chamber 105 is not affected, and a closed position 107 (see FIG. 11), where first and second orifices 108, 109 are partially blocked, resulting in a reduction of the sound reaching the resonance chamber 105.

Figure 12:
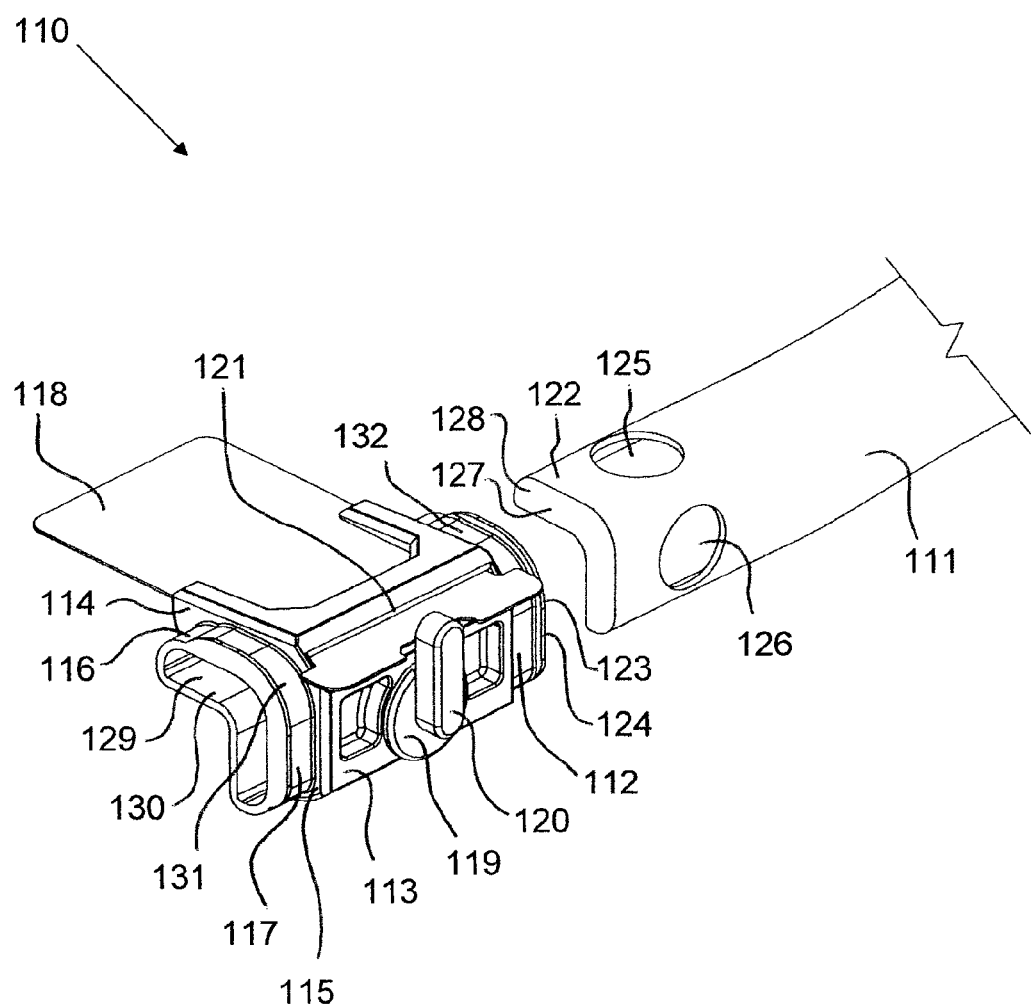
FIG. 12 is a schematic representation of a further embodiment of a toy exhaust device according to the invention, wherein the exhaust pipe is attachable to the body unit.

Referring to FIG. 12, a schematic representation of a further embodiment of a toy exhaust device according to the invention is illustrated generally at 110, wherein the exhaust pipe 111 is attachable to the body unit 112.

As in previous embodiments, the body unit 112 has a resonance chamber (not shown) located therewithin. A cardholder 113 is attached to the body unit 112 by clipping it over the body unit 112. Resilient shoulders 114, 115 on the cardholder 113 clip over the sides 116, 117 of the cardholder 113. An elongate, flexible card 118 is located in the cardholder 113 and overlies a first orifice (not shown) in the body unit 112.

An adjustable plug 119 is mounted on the card holder 113, which plug 119 blocks a second orifice (not shown) in the body unit 112 over which the elongate, flexible card 118 is not being held. The adjustable plug 119 has a member 120 thereon which prevents the card 118 from passing outward from a slot 121 in the cardholder 113, in use.

One end section 122 of the exhaust pipe 111 has a similar profile to the resonance chamber of the body unit 112, such that the end section 122 is receivable in the resonance chamber (not shown) through aperture 123 in end 124 of the body unit 112.

The end section 122 is hollow and has a pair of apertures 125, 126 therein, which apertures 125, 126 align with the first and second orifices (both not shown) in the body unit 112 respectively, when the exhaust pipe 111 is fixedly received in the body unit 112. The end section 122 is a snug fit within the body unit 112 such that the exhaust pipe 111 will not accidently separate from the body unit 112, in use.

Furthermore, the adjustable plug 119 engages in aperture 126 to hold the exhaust pipe in place.

One end 127 of the end section 122 is closed off by a wall 128, which wall seals the resonance chamber at end 129 of the body unit 112, when the exhaust pipe 111 is located therein.

In use, the device 110 is attachable to either side of a bicycle with the elongate, flexible card 118 being positioned over the appropriate first or second orifice (not shown).

Alternatively, the end section 122 of the exhaust pipe 111 is receivable in the resonance chamber (not shown) of the body unit 112 through aperture 130 in end 129 of the body unit 112, such that, in use, apertures 125, 126 align with the second and first orifices (not shown) of the body unit 111 respectively. Thus, in use, the device 110 can be moved from one side of the bicycle (not shown) to the other without having to change the position of the cardholder 113.

The device 110 is attachable to the frame of the bicycle (both not shown) by a pair of cable ties (not shown). Formations 131, 132 on the body unit 112 secure the cable ties (not shown) in position around the body unit 112, in use.

The invention claimed is:

1. A toy exhaust pipe assembly for a bicycle, comprising:
an exhaust pipe comprising three sections, including:
an elongate cylindrical tube section having an axis of symmetry, and a first cylindrical tube plane of symmetry that includes the axis of symmetry;
a tubular neck section having a base connected to a proximal end of the elongate cylindrical tube section, the tubular neck section having a tubular neck plane of symmetry; and
an A-shaped mounting bracket section having a distal end connected to a proximal end of the oblique frusto conical neck section, the A-shaped mounting bracket including a first orifice on a first side and a second orifice on a second side, and the A-shaped mounting bracket section having a mounting bracket plane of symmetry;
wherein the first cylindrical tube plane of symmetry, the tubular neck plane of symmetry, and the mounting bracket plane of symmetry all coincide in a common plane.

2. The toy exhaust pipe assembly of claim 1, further comprising a card holder configured to attach to the A-shaped mounting bracket, the card holder comprising a pair of card retaining arms configured to extend a card over the first orifice while plugging the second orifice when seated on the A-shaped mounting bracket.

3. The toy exhaust pipe assembly of claim 2, wherein the A-shaped mounting bracket forms a ninety degree angle between the first and second sides.

4. The toy exhaust pipe assembly of claim 2, wherein the card holder includes a resilient clip for mounting a card over the first orifice.

5. The toy exhaust pipe assembly of claim 2, wherein the card holder is adapted to further plug the first orifice while extending a card over the second orifice.

6. The toy exhaust pipe assembly of claim 2, wherein the card holder includes a slot for receiving a card, and a tightening mechanism for securing the card therein whereby an effective length of the card can be adjusted to maximize a sound output of the toy exhaust pipe assembly.

7. The toy exhaust pipe assembly of claim 1, wherein the first orifice and second orifice are symmetric with respect to the mounting bracket plane of symmetry.

* * * * *